United States Patent [19]
Harmon

[11] 3,752,294
[45] Aug. 14, 1973

[54] CAP SORTING APPARATUS
[75] Inventor: Shepard Lewis Harmon, Toledo, Ohio
[73] Assignee: Owens-Illinois Inc., Toledo, Ohio
[22] Filed: June 8, 1972
[21] Appl. No.: 260,818

[52] U.S. Cl. .......................................... 198/33 AA
[51] Int. Cl. ............................................ B65g 47/24
[58] Field of Search ...................... 198/33 R, 33 AA

[56] References Cited
UNITED STATES PATENTS
3,318,434   5/1967   Waller........................... 198/33 AA

*Primary Examiner*—Richard E. Aegerter
*Attorney*—Steve M. McLary et al.

[57] ABSTRACT

An improved wheel-type sorter for magnetic and non-magnetic skirted closure caps. A hollow cap transfer disk is rotated by a rim drive system. The transfer disk is mounted in facing relationship with an annular, bell-shaped support member. A series of orifices in the periphery of the face of the transfer disk facing the support member are connected to a source of vacuum. Caps to be sorted are fed through the support member and are adhered on the transfer disk, in substantially single file, near the bottom of the transfer disk's path of travel by the effect of the vacuum present at the orifices. The caps so adhered are rotated upwardly as the disk moves to a sorting zone. A guide member just prior to the sorting zone positions caps for accurate discrimination in the sorting zone. A rotating wheel in advance of the guide member deflects slightly misaligned caps into contact with the guide member. In the sorting zone, a discriminating finger accepts caps which have their interior facing the transfer disk and rejects caps having their interior facing away from the disk. Finally, outlet guide rails guide accepted caps away from the influence of the vacuum in the orifices and deliver the caps in single file to a capping process.

13 Claims, 15 Drawing Figures

Patented Aug. 14, 1973

Patented Aug. 14, 1973

CAP SORTING APPARATUS

BACKGROUND OF THE INVENTION

This invention generally relates to closure cap sorters. More particularly, this invention relates to wheel-type cap sorters. Most specifically, this invention relates to a wheel-type sorter using vacuum to adhere caps to the wheel for discrimination.

Wheel-type cap sorters are not new in the art and have been in general use for a number of years. Such sorters generally used a magnet transfer disk to carry caps to a sorting mechanism. Examples of such devices are shown in U.S. Pat. Nos. 2,836,947; 3,065,841; and 3,338,372. However, these sorters are completely useless for sorting nonmagnetic caps made of aluminum or plastic. The advent of the aluminum, pull tab type cap rendered these sorters unusuable. A transfer disk which holds the caps by vacuum is a solution to this problem. One example of such a device in the prior art is shown in U.S. Pat. No. 3,209,888. However, this device could not sort ring pull caps. All of the prior art devices were subject to jamming, a problem which I have fully overcome. In addition, my device will sort ring pull caps at a much higher rate than any known device, such as bowl-type sorters which are now in use to sort ring pull caps.

SUMMARY OF THE INVENTION

My invention is an apparatus for sorting skirted closure caps which comprises, in combination: a hollow cap transfer disk mounted for rotation about a substantially horizontal axis, said disk containing a plurality of peripherally arranged orifices on one exterior face of said disk and communicating with the interior of said disk; means connected to the interior of said disk for producing subatmospheric pressure within said disk; means adjacent the lower portion of said disk and said peripheral orifices for directing caps to an on-edge, single-file alignment along the peripheral portion of said disk to allow said directed caps to be held to said disk under the influence of said subatmospheric pressure; means for supplying caps to said directing means; means for rotating said disk to thereby move caps held thereon successively to a sorting zone adjacent the upper edge of said disk; cap guiding means extending into said sorting zone for positively positioning caps at a pre-selected radial distance from said horizontal axis as the caps enter said sorting zone; continuously rotating means in advance of said guiding means for deflecting slightly misaligned caps into contact with said guiding means; discriminating means in said sorting zone for accepting caps having the interior thereof facing said disk and rejecting caps having the interior thereof facing away from said disk; and outlet means at the exit end of said sorting zone for guiding accepted caps in single file from the influence of said subatmospheric pressure in said disk.

DETAILED DESCRIPTION OF THE DRAWINGS

Figure 1:
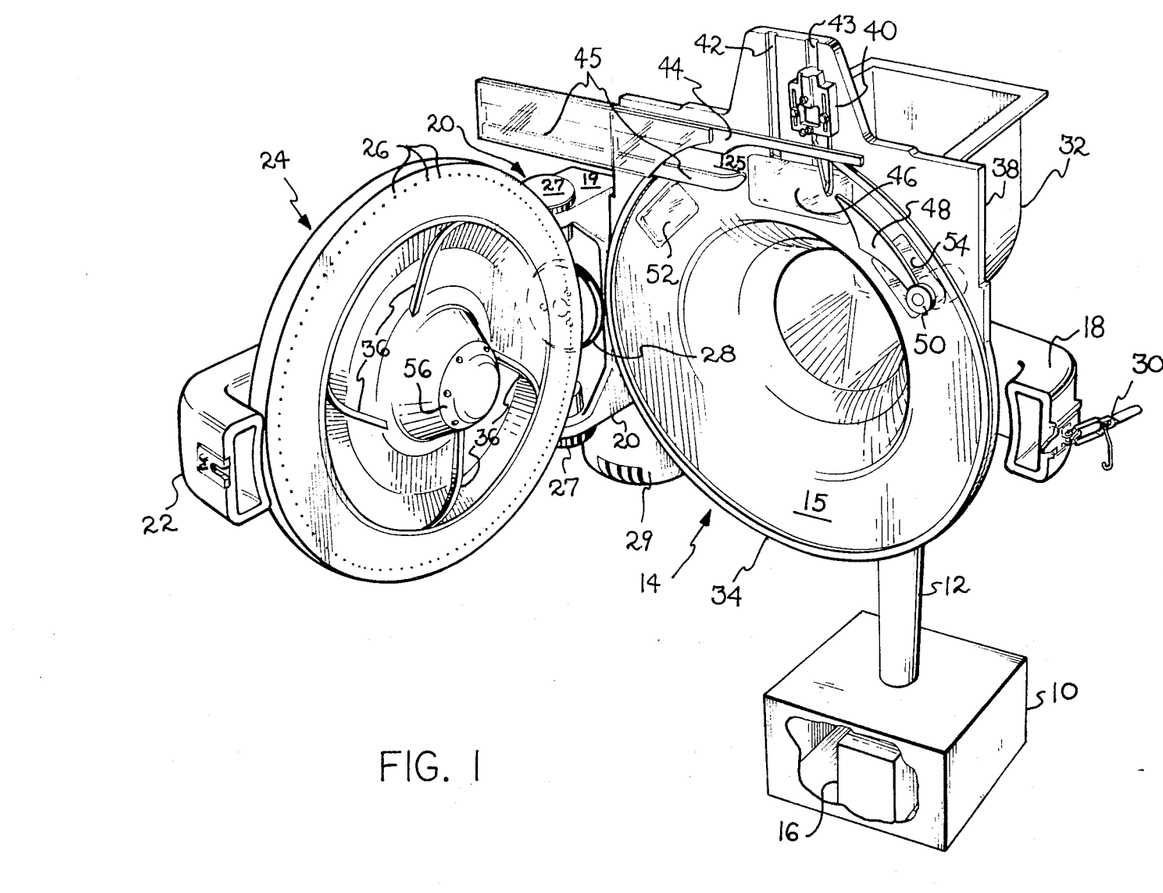
FIG. 1 is a perspective view of the apparatus of the present invention with the cap transfer disk in its' open position.

As may be seen in FIG. 1, the cap sorting apparatus of the present invention is supported on a base 10. A substantially vertical, hollow mounting post 12 is attached to the base 10. The mounting post 12 serves to support a substantially bell-shaped annular supporting member 14, which is mounted with its' longitudinal axis substantially horizontal. The passageway in the hollow mounting post 12 is connected to a source of vacuum 16, which may be conveniently mounted in the base 10. The passageway within the hollow mounting post 12 connects to a series of passageways within a bell-shaped supporting member 14 (see FIG. 2). A vacuum connector line 18 is connected to the passageway within the supporting member 14 which communicates with the passageway within the mounting post 12. On the flared face of the mounting member 14 on the side opposite the termination of the vacuum connector line 18, a hinge assembly 20 is attached to hingedly support a substantially U-shaped, hollow crossbeam 22. The hinge assembly 20 has an upper hinge pad 19 and a lower hinge pad 20. Both of the hinge pads 19 and 20 are attached to the supporting member 14. Attached to the crossbeam 22 are extending upper and lower ears 23 (see FIG. 2) which are not visible in FIG. 1. The ears 23 and the pads 19 and 20 all have hinge pin holes drilled completely through them. The pads 19 and 20 and the ears 23 are positioned with the hinge pin holes in alignment. Then, hinge pins 25 (see FIG. 2) are inserted through the holes to connect the cross-beam 22 to the supporting member 14 in a hinged manner. The hinge pins 25 are secured in position in the holes to ensure a stable connection. Only the cap ends 27 of the hinge pins 25 are visible in FIG. 1. A hollow cap transfer disk 24 is rotatably mounted on the crossbeam 22. A plurality of orifices 26 are arranged around the peripheral portion of the cap transfer disk 24 and communicate with the hollow interior of the cap transfer disk 24. A motor driven drive wheel 28 serves as a means for rotating the cap transfer disk 24. In the configuration shown in FIG. 1, the crossbeam 22 has been pivoted about the hinge assembly 20 to place the cap transfer disk 24 at right angles to the supporting member 14. In the normal operational position, the crossbeam 22 is pivoted ninety degrees to place the face of the transfer disk 24 containing the orifices 26 in facing relationship with a flange portion 15 of the supporting member 14. In this position, the drive wheel 28 engages the rim of the cap transfer disk 24 in such a manner that the cap transfer disk 24 will be driven as the drive wheel 28 is rotated by a drive motor 29. In addition, in this position, the crossbeam 22 will be brought into connection with the vacuum connector line 18. This will allow a complete vacuum path through the crossbeam 22 into the vacuum connector line 18, through the supporting member 14, and through the mounting post 12 to the vacuum source 16. A clamp mechanism 30 is used to hold the cross-beam 22 in a closed position when cap sorting is undertaken. A cap hopper 32 is attached to the rear portion of the supporting member 14 and serves as a means for holding and supplying a source of caps into the cap sorting mechanism. A cap retaining wall 34 extends about substantially the entire periphery of the flange portion 15 of the supporting member 14. The cap retaining wall 34 prevents escape of caps being sorted when the transfer disk 24 has been moved into facing relationship with the flange portion 15. On the face of the transfer disk 24 containing the orifices 26, rib-like agitators 36 are mounted to lift and impart a tumbling action to the closures and contribute to the avoidance of clogging during operation. Each of these agitators 36 is of square bar stock and longitudinally is, as we define it, of an abbreviated "J" shape with the curved end foremost and near the periphery of the cap transfer disk 24. This curved front end is tapered to a thin tip so that it is less likely to mar or cause clogging of caps and permits high-speed operation of the apparatus. It, in fact, functions to clear caps from a space created between the flange portion 15 and the cap transfer disk 24. A vertical extension 38 of the supporting member 14 serves to carry a sorting mechanism 40 (see FIG. 4). The sorting mechanism 40 is vertically adjustable in either one of two vertical slots 42 and 43 provided in the vertical extension 38. Opposite the sorting mechanism 40, opposed guide rails 44 and 45 are mounted in the path of travel of closures which are adhered to the transfer disk 24 and provide an outlet means for guiding accepted caps in a single file from the influence of the vacuum in the transfer disk 24. The guide rails 44 and 45 are also attached to the vertical extension 38. The guide rails 44 and 45 in a sense act as a sweep rail which clears any cap which approaches their inlet area still adhered to the face of the cap transfer disk 24. A transparent window 46 is positioned adjacent the sorting mechanism 40 to allow visual observation of the sorting operation and to facilitate setting up the cap sorting mechanism for different sizes of caps. The area which may be viewed through the window 46 constitutes essentially an area near the top of the supporting member 14 and which area may be considered to be a "sorting zone" in the most general sense. Just prior to the sorting zone, a guide member 48 attached to the flange portion 15 serves as a cap guiding means for positively positioning caps in the sorting zone. Preceding the guide member 48 is an adjustable rotating wheel 50 which acts as a means for deflecting slightly misaligned caps into contact with the guide member 48. In addition, a third transparent window 54 in the flange portion 15 allows a visual check on the operation of the guide member 48 and the adjustable rotating wheel 50. A transparent window 52 is provided in the flange portion 15 to allow a visual check of the proper operation of the sorting mechanism 40. A substantially conical rejected cap deflector 56 is located centrally on the face of the transfer disk 24 which contains the orifices 26. The function of the cap deflector 56 will be explained in detail later, but the purpose is basically to prevent caps which are rejected by the sorting mechanism 40 from being repositioned in exactly their same improperly oriented attitude.

Figure 2:
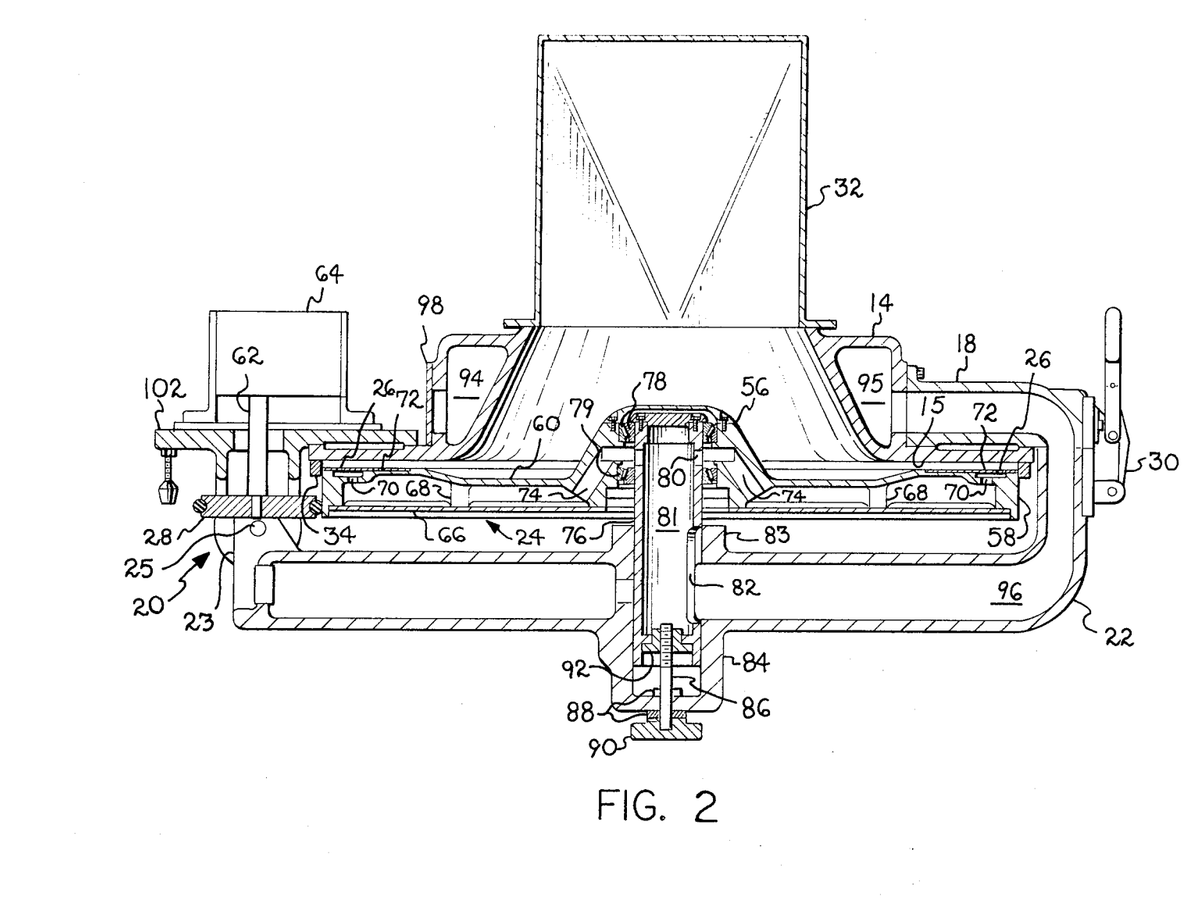
FIG. 2 is a top cross-sectional view of the apparatus of the present invention taken along the line 2—2 in FIG. 3.
Figure 3:
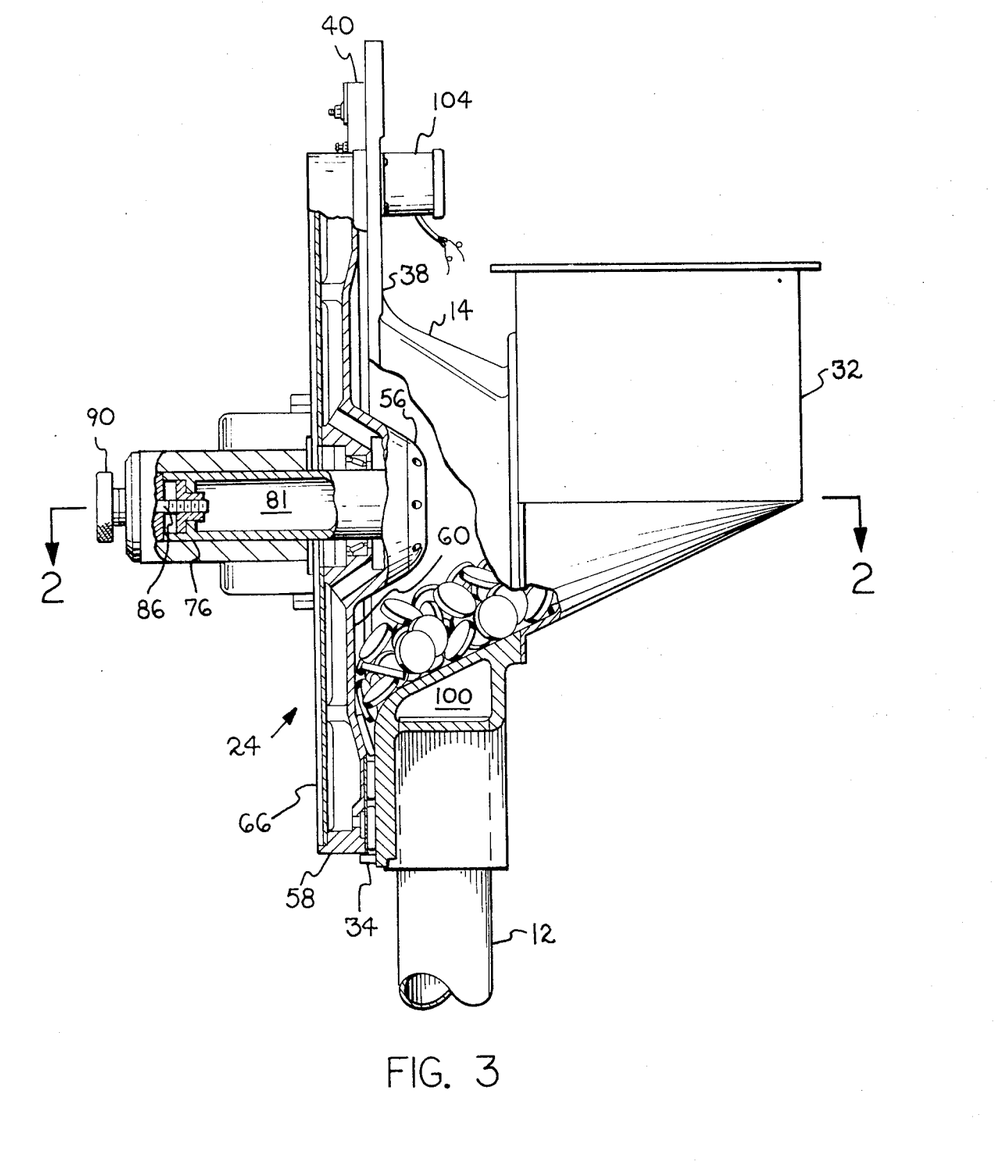
FIG. 3 is a side-elevational view, with parts broken away to illustrate caps retained adjacent the flange of the supporting member of the apparatus of the present invention.

FIG. 2 illustrates the path taken by the vacuum produced by the vacuum source 16 to the orifices 26, and, in addition, shows the details of the construction and mounting of the transfer disk 24. The conical cap deflector 56 may be considered to be a hub portion of the transfer disk 24 which is connected to a rim portion 58 by a central connecting plate 60. It may be noted that the configuration shown in FIG. 2 is that in which the cap sorting apparatus is in position for operation. That is, the transfer disk 24 has been closed and latched in position facing the flange portion 15. In this position, it can be appreciated that the rim portion 58 of the transfer disk 24 cooperates with the cap retaining wall 34 to prevent any caps from falling out of the apparatus while it is in operation. In addition, the drive wheel 28 is seen to be in driving engagement with the rim portion 58. The drive wheel 28 is driven by a drive shaft 62, which, in turn, is driven by a gear box 64 powered by the drive motor 29. The hollow interior of the transfer disk 24 is completed by the addition of a back plate 66 which, effectively, completely seals the interior of the transfer disk, leaving an open space between the connecting plate 60 and the back plate 66. The back plate 66 and the connecting plate 60 are interrupted at intervals by strengthening bosses 68, which serve to ensure the rigidity of the transfer disk 24. At the peripheral edges of the connecting plate 60, a recessed portion is provided. This recessed portion is connected to the hollow interior of the transfer disk 24 with a plurality of passageways 70. The recessed portion of the connecting plate 60 is covered to bring it flush with the remainder of the transfer disk 60 with a ring-like cap vacuum plate 72. The vacuum plate 72 has drilled completely through it the orifices 26, which, in turn, are in communication with the passageways 70. The cap deflector portion 56 has drilled in it angled passageways 74, which communicate with the space within the cap transfer disk 24. It should be noted that in the unassembled state, there is an opening completely through the cap deflector 56, and the passageways 74 are thus in communication with the atmosphere. However, as seen in FIG. 2, the normally assembled state of the cap sorter is such that the cap transfer disk 24 is rotatably mounted on a hollow shaft 76. For smooth rotation, the transfer disk 24 is mounted on the hollow shaft 76 with a set of front tapered roller bearings 78 and a set of rear tapered roller bearings 79. An opening 80 in the hollow shaft 76 exterior wall communicates with an internal passageway 81 of the hollow shaft 76. As the transfer disk 24 is rotated relative to the hollow shaft 76, which, of course, remains stationary, the passageway 80 will, in turn, be engaged with the passageways 74 and thus in communication with the hollow interior of the transfer disk 24. At the opposite end of the hollow shaft 76, an elongated slot 82 is provided completely through the exterior wall of the hollow shaft 76. The hollow shaft 76 is slideably mounted in a central bore extending completely through the crossbeam 22 and defined by two opposed bosses 83 and 84 located approximately centrally on the crossbeam 22. The boss 83 has the central bore open toward the supporting member 14 for insertion of the hollow shaft 76. The boss 84 is closed at its' terminal point with an opening through which an adjusting screw 86 is inserted. The adjusting screw 86 is held in a fixed position by two lock rings 88. The lock rings 88 constrain the adjusting screw 86 to a purely rotational movement. One end of the adjusting screw 86 extends beyond the boss 84 and has attached to it a handwheel 90, which allows an operator to rotate the adjusting screw 86. The opposite end of the adjusting screw 86 is threaded and is in threaded engagement with a threaded adjustment block 92 which is attached to the hollow shaft 76. The net result of this entire mounting arrangement is that, by turning the handwheel 90 and thus rotating the adjusting screw 86, the hollow shaft 76 is caused to move toward or away from the flange 15. This, of course, causes movement of the entire transfer disk 24 in a similar manner. The purpose of this adjustment is to allow caps of varying thicknesses to be effectively sorted by this cap sorting apparatus. As seen in FIG. 2, a space is created between the vacuum plate 72 and the flange 15. This space is set by use of the adjusting screw 86 to approximately the thickness of the closure to be sorted. The adjustability allows a relatively wide range of thicknesses to be effectively sorted. FIG. 3 may more clearly show the functioning of this particular space, and the space will be further discussed in conjunction with FIG. 3.

Still with reference to FIG. 2, it may be seen that the supporting member 14 is formed with two integral, vertically extending vacuum passages 94 and 95. Both of the vacuum passages 94 and 95 have an opening communicating with the atmosphere near the level of the crossbeam 22. In the configuration shown in FIG. 2, the vacuum passage 95 is in communication with the vacuum connector line 18. The other vacuum passage 94 is closed with a sealing plate 98. The sealing plate 98 is necessary to prevent escape of vacuum from the passage 94, since the vacuum passages 94 and 95 are connected at their lower terminus to a common cross vacuum passage 100 (see FIG. 3), which, in turn, is connected to the central bore in the hollow mounting post 12. The provision of two vacuum passages 94 and 95 allow the cap sorter to be readily configured as either a righthand opening sorter or a left-hand opening sorter. That is, in the embodiment illustrated, the hinge assembly 20 is located on the left side of the cap sorter. However, by interchanging the connection of the crossbeam 22 with the vacuum connector line 18 to the vacuum passage 94, of course removing the sealing plate 98, and placing the hinge mechanism 20 in the relative position occupied by the vacuum connector line 18, as shown in FIGS. 1 and 2, a right-hand opening machine may be constructed. Of course, in this situation, the vacuum passage 95 would be sealed with a sealing plate 98, and the motor 29, the gear box 64, and the drive wheel 28 would be moved to correspond to the new position of the hinge assembly 20. The motor 29 and the gear box 64 are attached to the flange 15 through a motor mounting plate 102. In summary, the path of vacuum flow in the cap sorting apparatus may be described as the following: the vacuum source 16 serves as a means for generating a subatmospheric pressure. This source 16 is connected to the interior bore of the hollow mounting post 12. The interior bore of the hollow mounting post 12, in turn, connects with the vacuum cross passage 100, which is connected to the two vertical vacuum passages 94 and 95. In the configuration shown, the vacuum passage 95 is connected to the vacuum connector line 18, which, in turn, connects to the interior passageway 96 of the crossbeam 22. The interior passageway 96, in turn, is connected to the main passageway 81 in the hollow shaft 76 through the elongated slot 82. The main passageway 81 in the hollow shaft 76, in turn, is connected to the passageways 74 through the conical cap deflector 56 with the opening 80 in the hollow shaft 76. The passageways 74 are connected to the hollow interior of the cap transfer disk 24 and vacuum then may be applied through the passageways 70 connecting with the orifices 26 in the cap vacuum plate 72. The net result of this entire vacuum flow system is that a relatively flat object which is placed over the orifices 26 will be adhered to the cap vacuum plate 72 so long as the vacuum source 16 is in operation.

FIG. 3 illustrates generally the manner in which closures are forced to attain a position in single file against the cap vacuum plate 72 so that they will be held by the vacuum flow through the orifices 26. A mass of closures is fed from the hopper 32 down the flared portion of the support member 14. It will be noted that the center portion of the connecting plate 60 is slightly depressed relative to the plane of the cap vacuum plate 72. It is in this depressed center portion that the agitators 36 are located. As closures flow forward toward the transfer disk 24, they slide down the depressed central portion of the connecting plate 60 toward the cap vacuum plate 72. This motion allows the caps to attain a substantially onedge position. The agitators 36 continually stir the mass of caps and thus prevent jams from occurring at this particular point. The gap between the cap vacuum plate 72 and the flange 15 noted in connection with the discussion of FIG. 2 may now be seen to be adjusted such that it is approximately equal to the thickness of a cap being sorted. Thus, the caps slide downward along the cap vacuum plate 72 until they are stopped by the cap retaining wall 34. In this position, the vacuum furnished by the orifices 26 will adhere a cap in this position to the cap vacuum plate 72. Since the transfer disk 24 is rotating in its' normal operational configuration, the cap which has assumed such a position held against the cap vacuum plate 72 will be rotated upward toward the sorting mechanism 40. Additionally in FIG. 3, a drive motor 104 for the adjustable rotating wheel 50 may be seen.

Figure 4:
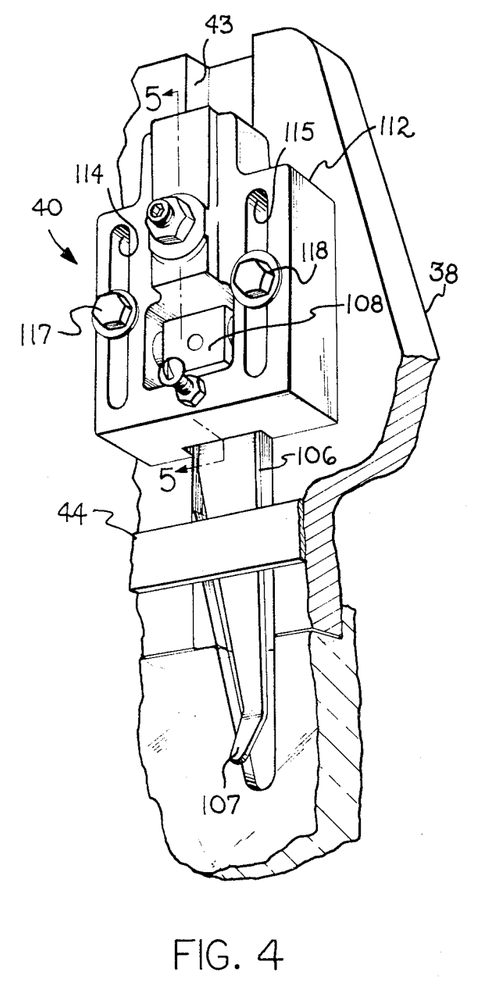
FIG. 4 is a perspective view of the sorting mechanism of the present invention.
Figure 5:
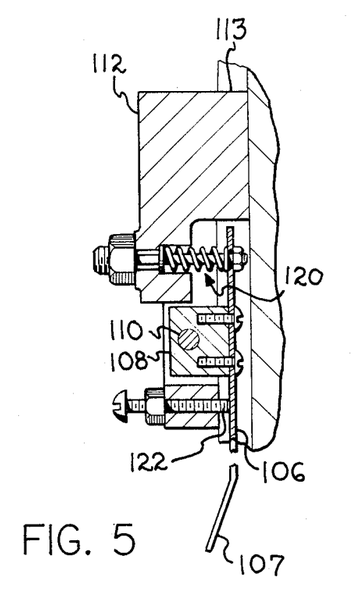
FIG. 5 is a side cross-sectional view of the sorting mechanism of FIG. 4, on a reduced scale, taken along the line 5—5 in FIG. 4.
Figures 6, 7:
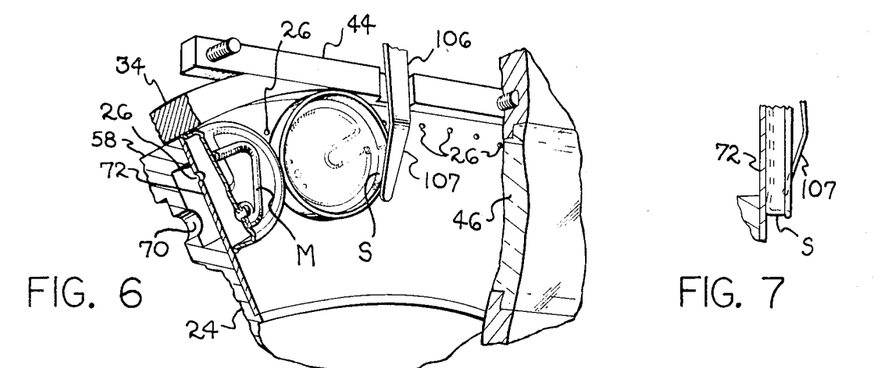
FIG. 6 is a fragmentary perspective view, looking through the window adjacent the sorting zone from the rear of FIG. 1, showing the position of an improperly oriented cap as its' skirt initially contacts the tip of the sorting finger.
FIG. 7 is a side view of a portion of the area shown in FIG. 6 illustrating the position of the cap and the sorting finger tip.
Figure 8:
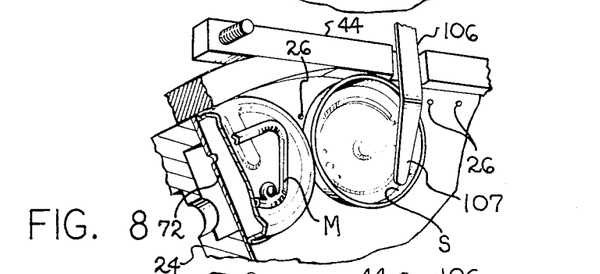
FIG. 8 is a view similar to FIG. 6, showing the sorting finger upon initial entry into the open side of the cap.
Figure 9:
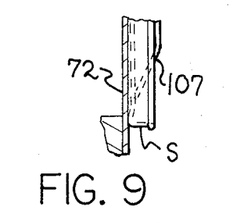
FIG. 9 is a view similar to FIG. 7, showing the sorting finger upon initial entry into the open side of the cap.
Figure 10:
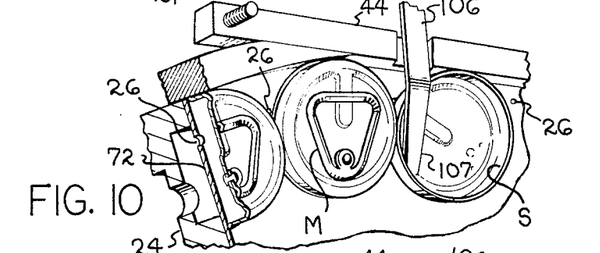
FIG. 10 is a view similar to FIG. 6, showing the finger at the opposite side of the cap from the position of FIG. 8, thus stopping the normal advance of this particular cap.
Figure 11:
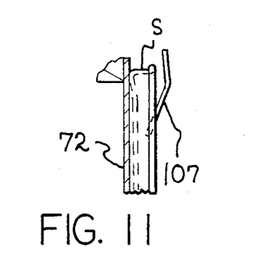
FIG. 11 is a view similar to FIG. 7, showing the cap, while held against normal advancing movement, being shifted laterally downward by a combination of the line pressure of the advancing caps and engagement of the sorting finger with the rearmost segment of the attaching skirt.
Figure 12:
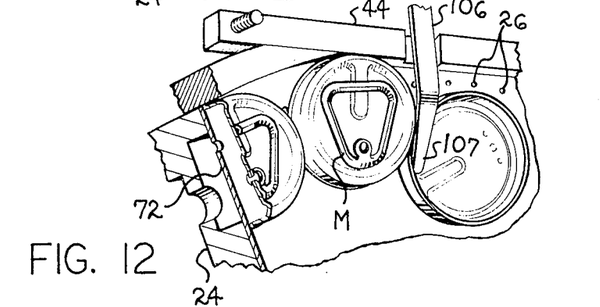
FIG. 12 is a view similar to FIG. 6, showing the cap, while held against normal advancing movement, being shifted laterally downward by a combination of the line pressure of the advancing caps and engagement of the sorting finger with the rearmost segment of the attaching skirt.

FIGS. 4 and 5 illustrate the details of the sorting mechanism 40. It may be appreciated that the sorting mechanism 40 serves as a discriminating means in the sorting zone for accepting caps which have the interior thereof facing the transfer disk 24 and rejecting caps which have the interior thereof facing away from the transfer disk 24. This particular function will be explained in detail later. For the basic discrimination function, the sorting mechanism 40 utilizes a sorting or discriminating finger 106, which, in the illustrated embodiment, is an elongated, thin, narrow strip of steel extending vertically and having at its' lower end a finger tip portion 107. The tip portion 107 is an integral part of the finger 106 and preferably is at an obtuse angle of about 25° with respect to the finger 106. The finger 106 is secured to a rockable hinge block 108, which is mounted on a horizontal pivot pin 110. The pivot pin 110 is secured to a suitable carrier block 112. The carrier block 112 has a lower slide portion 113 which is constrained to a sliding motion within the slot 43, or, if desired, within the slot 42. The carrier 112 is, in a sense, a slide moveable vertically in one of the two slots 42 or 43 to any elevation required by the cap diameter and to the desired position of the finger tip portion 107 in relation to the caps. The carrier block 112 has two elongated longitudinal slots 114 and 115 located adjacent to the outer perimeter of the carrier block 112 on opposite sides of the face of the carrier block 112. Two bolts 117 and 118 (only the heads of which are visible in FIG. 4) are inserted through the slots 114 and 115 and are in threaded engagement with the vertical extension 38 of the support member 14. When the bolts 117 and 118 are tightened, the carrier block 112 is fixed in position. Loosening the bolts 117 and 118 allows the carrier block 112 to be adjusted vertically by sliding the carrier block 112 as allowed by the slots 114 and 115. The major portion of the sorting finger 106 lies between the path of the moving caps and the adjacent wall of the flange 15 and clears the advancing caps. The finger tip portion 107, however, has its' free lower end normally projecting into the path of the lowermost portion or panels of the caps. The projection of the tip portion 107 is obtained by a spring device 120 carried by the carrier block 112. The extent of projection is regulatable by means of an adjustable stop 122 mounted in the carrier block 112 beneath the hinge block 108. Thus, the finger tip portion 107 is yieldingly engageable with the caps.

Closure caps are delivered into the sorting zone in a single-file order, one after the other. When a closure cap reaches the sorting zone with its' open side toward or facing the discriminating finger 106, the tip portion 107 will be so positioned that it will be deflected by the cap skirt S (see FIG. 6) and then snap into the cap with clearance between the tip 107 and the inside diameter of the cap. The finger portion 107 serves as a hook riding along the interior of a portion of the cap skirt S and working with a trailing portion of the latter to deflect this particular cap downwardly, out of the line of advancing caps and beyond the influence of the subatmospheric pressure produced through the orifices 26. Therefore, the cap, except for the presence of the finger 107, would fall back toward the lower portion of the supporting member 14. However, the cap supporting tendency of the finger 107 is overcome by the line pressure of following caps, thus pushing the unoriented cap completely out of line and allowing it to fall back. FIGS. 6 through 12 illustrate the positions of the finger tip portion 107 in an improperly oriented cap involved in effecting return of the improperly oriented cap. As rejected caps fall downwardly, they will strike the conical deflector 56 and their path of travel will be interrupted. This function is important, since it ensures that a cap which is rejected for being improperly oriented will be randomly redistributed with the mass of caps being aligned at the lower portion of the supporting member 14. If the conical deflector 56 were not provided, an improperly oriented cap might fall directly downward and be re-engaged by the orifices 26 at the lower portion of the transfer disk 24 and be re-presented for discrimination. This sort of operation would eventually lead to a complete cessation of output from the cap sorting mechanism, as all of the caps would eventually become improperly oriented and would simply be dropped back downward for re-presentation and discrimination. It should be realized, of course, that the views shown in FIGS. 6 through 12 are a view as if one were looking through the transparent window 46 provided in the flange 15.

Figure 13:
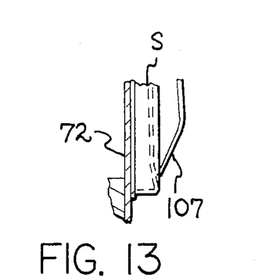
FIG. 13 is a fragmentary detail sectional elevational view, showing the tip end of the resilient sorting finger contacting the lower marginal portion of the panel of a properly oriented cap to permit uninterrupted advance and discharge of the cap.

As seen in FIG. 13, those closure caps which arrive in the sorting zone with a closed or panel side facing the sorting finger will spring the tip portion 107 slightly, whereupon the tip portion 107 glides lightly over the lowermost marginal portion of the cap upper panel. Thus, any finger tendency to interfere with the smooth advance of these caps with the transfer disk 24 is minimized. These caps move through the sorting zone beyond which the guide rails 44 and 45 wipe the cap off of the transfer disk 24, the line pressure of following caps serving to move these caps through a discharge opening 125 defined by the guide rails 44 and 45. It will additionally be noted in FIGS. 6 through 13 that the type of cap illustrated is an "easy open" or "tear tab" type of cap. This type of cap has a ring pull member M on its' upper panel to allow the removal of the tear strip portion. This particular type of cap has proven exceedingly difficult to sort in the past and to date only bowl-type sorters have been able to properly orient such caps. The difficulty lies in the inability of conventional wheel-type sorters to effectively utilize their magnetic pickup principles with caps which have the member M present.

Figure 14:
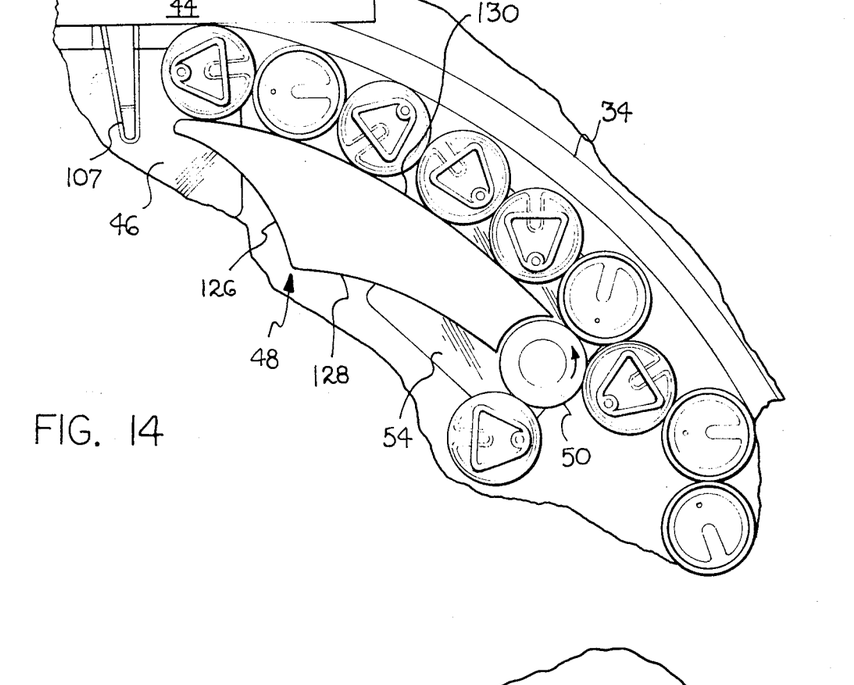
FIG. 14 is a fragmentary front view of the sorting zone, the guide rail leading into the sorting zone, and the rotating wheel in advance of the guide rail.

FIG. 14 illustrates in some detail the functioning of the guide member 48 and the rotating wheel 50. It will be noted that the guide rail 48 has several distinguishable portions. For example, there is a concave arcuate portion 126 adjacent the discriminating finger tip 107. The arcuate portion 126 is provided to allow a smooth flow of rejected caps. If the portion were not arcuate, caps which were rejected by the finger tip portion 107 might contact the edge of the guide member 48 and interfere with subsequent rejected caps before they could fall to the lower portion of the support member 14. The arcuate portion 126 guides a rejected cap away from the discriminating finger tip 107 to allow it to drop smoothly downward to be deflected by the conical deflector 56. The arcuate portion 126 blends with a further lower concave arcuate portion 128. The second arcuate portion 128 is provided to give a guiding path for rejected closures which are rejected by the rotating wheel 50. That is, caps are not always adhered to the transfer disk 24 in a straight line at the lower portion of the support member 14. Thus, as seen in FIG. 14, the line of caps is somewhat staggered and irregular just prior to the rotating wheel 50. As a matter of fact, caps may come into contact with the rotating wheel 50 two abreast, as well as being simply in an irregular pattern. The wheel 50 rotates in direction noted in FIG. 14 and tends to rotate misaligned caps upward into contact with the cap retaining wall 34 or the upper surface 130 of the guide member 48. Those caps which are so grossly misaligned that the rotating wheel 50 cannot force them upward and into proper single-file alignment are forced downward to be resorted. These caps also strike the conical deflector 56 to allow a truly random pickup of resorted caps. It is impossible to predict the trajectory of a cap which is rejected by the rotating wheel 50, and it might be possible for such a rejected cap to be thrown upward to the area of the discriminator finger tip 107, thus interfering with proper functioning of the discriminating finger tip 107. Thus, the second arcuate portion 128 is provided to guide closures rejected by the rotating wheel 50 which have an upward trajectory, away from the discriminating finger tip 107. After such rejected closures leave the arcuate portion 128, they fall downward and again are deflected by the conical deflector 56. It may additionally be seen from FIG. 14 that the upper convex, arcuate portion 130 of the guide member 48 tapers slightly as the guide member 48 approaches the vicinity of the sorting zone. This taper forces the caps into more intimate contact with both the cap retaining wall 34 and the upper portion 130 of the guide member 48. Just as the caps are ready to be sorted by the discriminating finger tip 107, the caps are in contact with both the upper portion 130 and the cap retaining wall 34 to ensure an absolutely proper alignment at this critical point.

Figure 15:
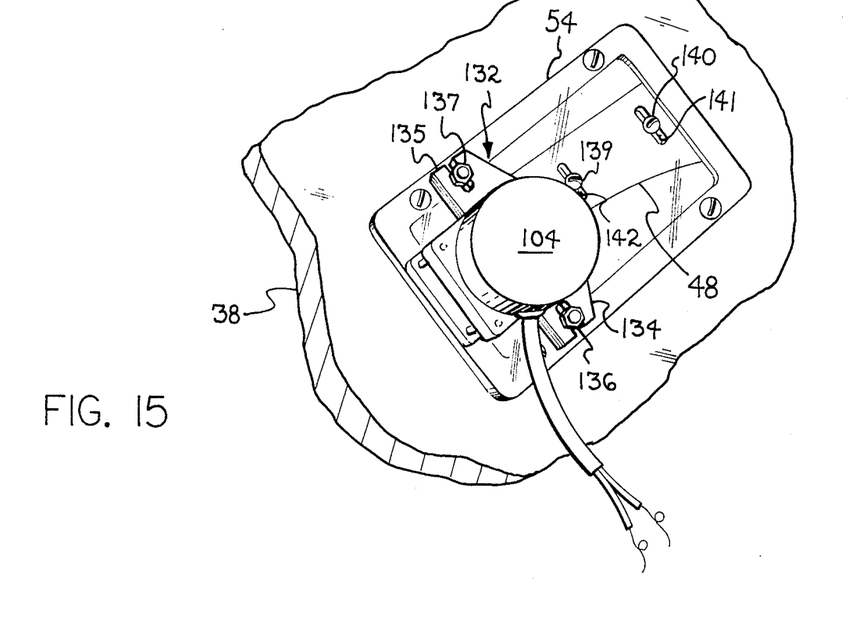
FIG. 15 is a fragmentary elevational view, looking through a window from the rear of FIG. 1, showing the mounting of the drive motor for the rotating wheel of FIG. 14 and the mounting of the guide rail of FIG. 14.

FIG. 15 is a view looking through the window 54 from behind the support member 14. It may be seen that the motor 104 which drives the rotating wheel 50 is mounted on a motor mounting pad 132, which has extending slotted ears 134 and 135 on either side. A slot, which is not visible, is provided in the window 54 to allow the shaft of the motor 104 to be directly connected to the rotating wheel 50. The motor mounting pad 132 may be positioned by sliding the motor mounting pad 132 with respect to the slots formed in the slotted ears 134 and 135 along two retaining bolts 136 and 137, which are fixed to the supporting member 14. When the motor 104 has been properly positioned, the bolts 137 and 136 may be tightened and the motor 104 held in position. This function is necessary, since caps of varying diameters may be sorted by this cap sorting apparatus, and the position of the rotatable wheel 50 must be adjustable to compensate for different cap diameters. Likewise, the guide member 48 is mounted on two screws 139 and 140, which extend through two slots 141 and 142 formed in the window 54. By loosening the screws 139 and 140, the guide member 48 may be adjusted, again to compensate for caps of varying diameters. Once the guide member 48 has been properly set for a specific cap diameter, the screws 139 and 140 are tightened to lock the guide member 48 into its' proper operational position.

It has been found necessary to rotate the wheel 50 to ensure that cap jamming does not occur at the point at which the guide member 48 and the cap retaining wall 34 begin to guide caps into the sorting zone. If the wheel 50 were simply a freely rotating wheel without having a positive drive as provided by the motor 104, two caps moving side by side could possibly jam the wheel 50 and prevent its' rotation, thus leading to a complete cessation of the cap sorting process. I have found that the motor 104 may most appropriately be set at a rotational speed of approximately eighteen-hundred revolutions per minute to obtain a proper non-jamming function for the rotating wheel 50.

One particularly desirable feature of the cap sorting apparatus of the present invention is its' insensitivity to the material from which a cap is made. Most cap sorters now on the market use magnetic transfer disks to pick up caps. However, the vacuum system of the present invention allows sorting of aluminum or plastic caps, as well as steel caps, without modification. This allows sorting of plastic cap inner liners as well as the caps themselves. In addition, a simple scale-up of the basic sorter will allow automatic sorting of caps of 120 mm or more in diameter. Finally, the positive jam-preventing features of the present cap sorter allow a rigid connection of the transfer disk 24 to the supporting member 14 during the sorting process.

What I claim is:

1. Apparatus for sorting skirted closure caps comprising, in combination: a hollow cap transfer disk mounted for rotation about a substantially horizontal axis, said disk containing a plurality of peripherally arranged orifices on one exterior face of said disk and communicating with the interior of said disk; means connected to the interior of said disk for producing subatmospheric pressure within said disk; means adjacent the lower portion of said disk and said peripheral orifices for directing caps to an on-edge, single-file alignment along the peripheral portion of said disk to allow said directed caps to be held to said disk under the influence of said subatmospheric pressure; means for supplying caps to said directing means; means for rotating said disk to thereby move caps held thereon successively to a sorting zone adjacent the upper portion of said disk; cap guiding means extending into said sorting zone for positively positioning caps at a preselected radial distance from said horizontal axis as the caps enter said sorting zone; continuously rotating means in advance of said guiding means for deflecting slightly misaligned caps into contact with said guiding means; discriminating means in said sorting zone for accepting caps having the interior thereof facing said disk and rejecting caps having the interior thereof facing away from said disk; and outlet means at the exit end of said sorting zone for guiding accepted caps in single file from the influence of said subatmospheric pressure in said disk.

2. The apparatus of claim 1, wherein said means for producing subatmospheric pressure comprises a supporting member having passages formed therein; a hollow cross-beam carried by said supporting member; means for connecting said passages to the interior of said hollow crossbeam; a shaft mounted on said crossbeam for rotatably supporting said transfer disk intermediate said crossbeam and said supporting member, said shaft having channels communicating with the interior of said transfer disk and the interior of said crossbeam; and a vacuum source connected to the passages of said supporting member.

3. The apparatus of claim 2, wherein said supporting member comprises a substantially bell-shaped, annular member with the flared end thereof positioned adjacent the fae of said transfer disk containing said orifices; and wherein said means for supplying caps includes a cap holding hopper connected to the end of said supporting member opposite said flared end.

4. The apparatus of claim 3, further including means for adjusting the distance between the flared end of said supporting member and said transfer disk.

5. The apparatus of claim 4, wherein said means for adjusting the distance between the flared end of said supporting member and said transfer disk comprises means for axially adjusting said shaft relative to said crossbeam.

6. The apparatus of claim 2, further including a hinge member attached to said supporting member for pivotally mounting said crossbeam, and a latch for releasably securing said crossbeam in position relative to said supporting member.

7. The apparatus of claim 3, further including a substantially conical rejected cap deflector positioned centrally on said transfer disk facing said flared end of said supporting member.

8. The apparatus of claim 1, further including a plurality of substantially J-shaped agitators mounted on the orifice containing face of said transfer disk for tumbling caps preparatory to their assuming on-edge positions on said disk.

9. The apparatus of claim 1, wherein said outlet means includes a sweep rail for removing from said disk and guiding to a discharge point those caps having their closed side facing said discriminating means.

10. The apparatus of claim 1, wherein said discriminating means comprises a vertically downwardly extending finger spaced horizontally from said transfer disk a distance in excess of the axial depth of said caps being sorted, a tip portion at the lower end of said finger disposed at an angle for projection into the open side of a cap, and means for yieldably urging said tip portion to a position for entry into a cap.

11. The apparatus of claim 1, wherein said cap guiding means includes a guide member having a convex arcuate upper surface radially, inwardly spaced from the peripheral path of movement of the caps moved by said disk, said guide member having its' forward end extending into said sorting zone.

12. The apparatus of claim 11, wherein said guide member further includes a first concave arcuate portion extending from the forward end of said guide member generally downwardly.

13. The apparatus of claim 12, wherein said guide member further includes a second concave arcuate portion extending upwardly from the end of said guide member adjacent said continuously rotating means and intersecting said first concave arcuate portion.

* * * * *

UNITED STATES PATENT OFFICE
CERTIFICATE OF CORRECTION

Patent No. 3,752,294                    Dated August 14, 1973

Inventor(s) SHEPARD LEWIS HARMON

It is certified that error appears in the above-identified patent and that said Letters Patent are hereby corrected as shown below:

Col. 6, line 59, "onedge" should be ---on-edge---.
Col. 11, line 8 (claim 3), "fae" should be ---face---.

Signed and sealed this 20th day of November 1973.

(SEAL)
Attest:

EDWARD M. FLETCHER, JR.          RENE D. TEGTMEYER
Attesting Officer                 Acting Commissioner of Patents